(12) United States Patent
Dantkale et al.

(10) Patent No.: US 12,561,207 B2
(45) Date of Patent: *Feb. 24, 2026

(54) DATABASE NODE SOFT RESTART

(71) Applicant: Salesforce, Inc., San Francisco, CA (US)

(72) Inventors: Suhas Dantkale, Cupertino, CA (US); James E. Mace, San Francisco, CA (US); Matthew Woicik, Bellevue, WA (US); Kaushal Mittal, Mountain House, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/739,282

(22) Filed: Jun. 10, 2024

(65) Prior Publication Data

US 2024/0330111 A1     Oct. 3, 2024

Related U.S. Application Data

(63) Continuation of application No. 17/938,423, filed on Oct. 6, 2022, now Pat. No. 12,007,842.

(51) Int. Cl.
*G06F 16/00* (2019.01)
*G06F 11/00* (2006.01)
(Continued)

(52) U.S. Cl.
CPC ...... *G06F 11/1438* (2013.01); *G06F 11/1453* (2013.01); *G06F 11/1466* (2013.01);
(Continued)

(58) Field of Classification Search
CPC ............. G06F 11/1438; G06F 11/1453; G06F 11/1471; G06F 16/2329; G06F 16/2379;
(Continued)

(56) References Cited

U.S. PATENT DOCUMENTS

| | | | |
|---|---|---|---|
| 6,279,076 B1 * | 8/2001 | Shishido | .......... G11B 20/10527 711/131 |
| 7,334,104 B2 * | 2/2008 | Piper | ..................... G06F 9/5016 711/170 |

(Continued)

FOREIGN PATENT DOCUMENTS

| | | | |
|---|---|---|---|
| EP | 4099170 B1 * | 6/2022 | |
| WO | WO 9804980 A1 * | 2/1998 | |

(Continued)

OTHER PUBLICATIONS

Kimberly M. Newberry et al., "Influences of domain knowledge on segmentation and memory", Memory & Cognition (2021) 49: pp. 660-674.*

(Continued)

*Primary Examiner* — Srirama Channavajjala
(74) *Attorney, Agent, or Firm* — Kowert, Hood, Munyon, Rankin & Goetzel, P.C.; Mark D. Seegers; Dean M. Munyon

(57)     ABSTRACT

Techniques are disclosed relating to restarting a database node. A database node may allocate memory segments that include a restart segment for storing data records. The database node may spawn processes to read a log and replay log records of the log to update the restart segment to store data records. The database node may determine to perform a restart operation to transition from a first mode to a second mode. Performing the restart operation may include ceasing reading the log at a stop position and storing, based on the stop position, database state information that enables the processes to resume reading the log from the stop position. The database node may further deallocate the memory segments except for the restart segment and terminate the processes. After performing the restart operation, the data- (Continued)

base node may spawn the processes, which may resume reading the log based on the database state information.

20 Claims, 8 Drawing Sheets

(51) Int. Cl.

| | |
|---|---|
| *G06F 11/14* | (2006.01) |
| *G06F 11/1446* | (2026.01) |
| *G06F 11/1471* | (2026.01) |
| *G06F 16/22* | (2019.01) |
| *G06F 16/23* | (2019.01) |
| *H04L 67/10* | (2022.01) |

(52) U.S. Cl.
CPC ...... *G06F 11/1471* (2013.01); *G06F 16/2272* (2019.01); *G06F 16/2282* (2019.01); *G06F 16/2322* (2019.01); *G06F 16/2329* (2019.01); *G06F 16/2343* (2019.01); *G06F 16/2379* (2019.01); *H04L 67/10* (2013.01); *G06F 2201/80* (2013.01)

(58) Field of Classification Search
CPC ............. G06F 16/2272; G06F 16/2343; G06F 16/2282; G06F 16/2322; G06F 16/113; G06F 16/2365; G06F 16/285; G06F 16/282
See application file for complete search history.

(56) References Cited

U.S. PATENT DOCUMENTS

| | | | | |
|---|---|---|---|---|
| 8,495,077 | B2 * | 7/2013 | Bayliss | G06F 16/282 |
| | | | | 707/758 |
| 8,775,544 | B2 * | 7/2014 | Umbehocker | H04L 69/18 |
| | | | | 718/1 |
| 10,122,575 | B2 | 11/2018 | Petersen et al. | |
| 10,572,510 | B2 | 2/2020 | Lee et al. | |
| 10,725,963 | B2 | 7/2020 | Suzue et al. | |
| 11,137,911 | B2 | 10/2021 | Kwon et al. | |
| 2002/0120824 | A1 | 8/2002 | Hooper, III | |
| 2007/0100973 | A1 * | 5/2007 | Cordsmeyer | H04L 41/069 |
| | | | | 709/221 |
| 2007/0185938 | A1 | 8/2007 | Prahlad et al. | |
| 2010/0191884 | A1 | 7/2010 | Holenstein et al. | |
| 2013/0117237 | A1 | 5/2013 | Thomsen et al. | |
| 2013/0166502 | A1 * | 6/2013 | Walkauskas | G06F 16/285 |
| | | | | 707/610 |
| 2014/0089455 | A1 * | 3/2014 | Khandai | H04L 67/1097 |
| | | | | 709/213 |
| 2016/0077746 | A1 | 3/2016 | Muth et al. | |
| 2016/0077966 | A1 * | 3/2016 | Stabrawa | G06F 12/08 |
| | | | | 711/172 |
| 2018/0046529 | A1 * | 2/2018 | Togawa | G06F 11/0787 |
| 2019/0236002 | A1 | 8/2019 | Chawla et al. | |
| 2019/0266077 | A1 * | 8/2019 | Lyons | G06F 12/023 |
| 2019/0391957 | A1 * | 12/2019 | Ye | G06F 16/113 |
| 2021/0004177 | A1 | 1/2021 | Lee et al. | |
| 2021/0081396 | A1 | 3/2021 | Tian | |
| 2021/0157746 | A1 | 5/2021 | Lee et al. | |
| 2021/0383878 | A1 | 12/2021 | Karr et al. | |
| 2022/0058094 | A1 | 2/2022 | Gunturu et al. | |
| 2022/0374439 | A1 * | 11/2022 | Hu | G06F 16/2365 |
| 2023/0140153 | A1 * | 5/2023 | Jernigan, IV | H04L 45/30 |
| | | | | 707/703 |

FOREIGN PATENT DOCUMENTS

| | | |
|---|---|---|
| WO | 2012083308 A2 | 6/2012 |
| WO | 2014150986 A1 | 9/2014 |
| WO | WO2016092430 A1 * | 6/2016 |
| WO | WO 2020155417 A1 * | 8/2020 |
| WO | 2022254368 A2 | 12/2022 |

OTHER PUBLICATIONS

Zheng Dang, et al., "PMAlloc: A Holistic Approach to Improving Persistent Memory Allocation", ACM Transactions on Computer Systems, vol. 42, Issue 3-4 Article No. 7, pp. 1-52.*

Peng Zhang et al., "RedisA High Performance In-Memory DatabaseBased on Segmented Memory", 8 IEEE Intl Conf on Parallel & Distributed Processing with Applications, Ubiquitous Computing & Communications, Big Data & Cloud Computing, Social Computing & Networking, Sustainable Computing & Communications, .2018 pp. 840-847.

Aishwarya Kumaraswamy et al., "The Log Structured Merge Forest", 2021 IEEE International Conference on Cloud Computing in Emerging Markets (CCEM), Oct. 2021, pp. 23-30.

\* cited by examiner

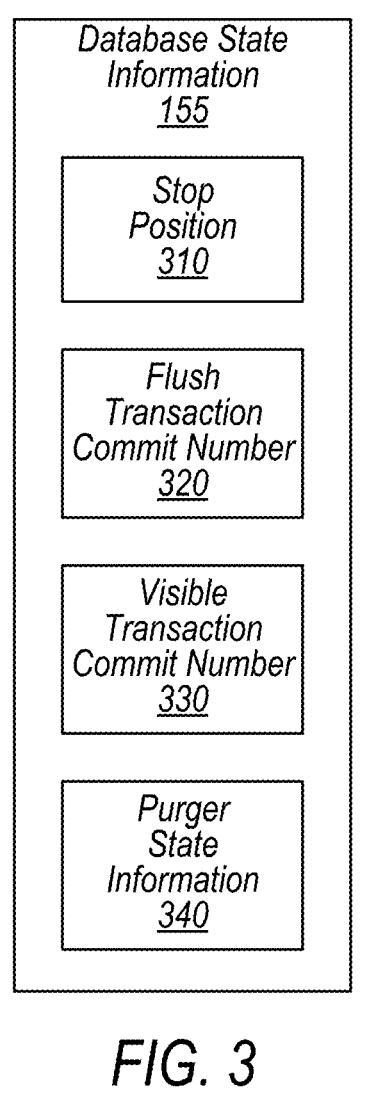

Database State
Information
155

Stop
Position
310

Flush
Transaction
Commit Number
320

Visible
Transaction
Commit Number
330

Purger
State
Information
340

FIG. 3

DATABASE NODE SOFT RESTART

PRIORITY CLAIM

The present application is a continuation of U.S. application Ser. No. 17/938,423, entitled "DATABASE NODE SOFT RESTART," filed Oct. 6, 2022 (U.S. Pat. No. 12,007, 842), the disclosure of which is incorporated by reference herein in its entirety.

BACKGROUND

Technical Field

This disclosure relates generally to a database system and, more specifically, to various mechanisms for restarting a database node.

Description of the Related Art

Modern database systems routinely implement management systems that enable users to store a collection of information in an organized manner that can be efficiently accessed and manipulated. In some cases, these management systems maintain a log-structured merge-tree (LSM tree) comprising multiple levels that each store information in database records as key-value pairs. A database system can include a persistent storage that houses the LSM tree and a database node having an in-memory buffer. During operation, the database node initially writes records into the in-memory buffer before later flushing them to the persistent storage. As a part of flushing records, the database system writes the records into new files that are stored in one of the many levels of the LSM tree. Over time, those records are rewritten into new files stored in lower levels as the records are moved down the LSM tree.

BRIEF DESCRIPTION OF THE DRAWINGS

FIG. 3 is a block diagram illustrating example elements of database state information, according to some embodiments.

DETAILED DESCRIPTION

Figure 1:
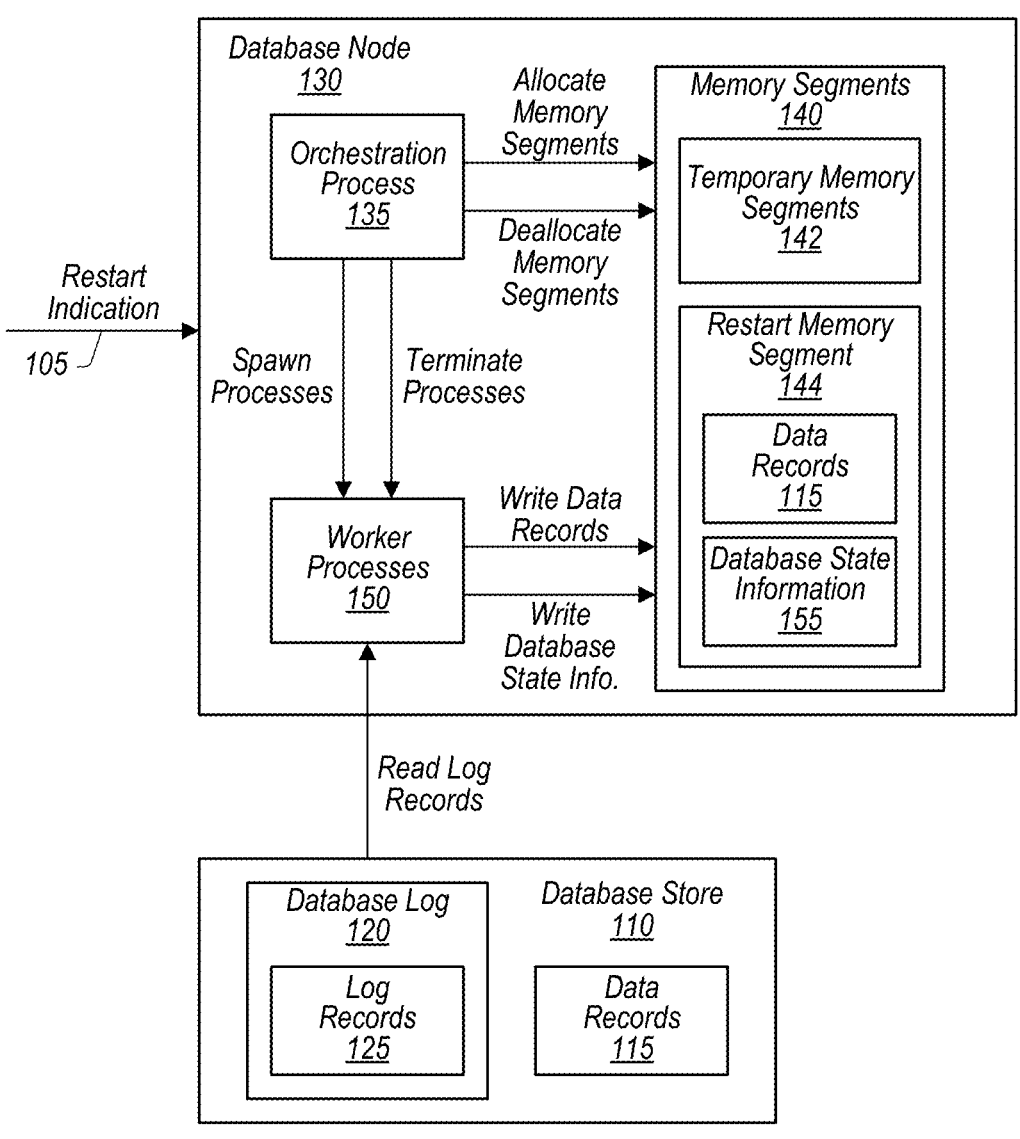
FIG. 1 is a block diagram illustrating example elements of a system having a database store and a database node, according to some embodiments.

In certain cases, a database system comprises multiple database nodes that facilitate the operations of a database. For example, a database system may include a primary database node that can process read and write transactions and one or more non-primary database nodes, such as secondary database nodes that process certain read transactions. In some cases, there can be multiple node clusters with one cluster having a primary database node and others having non-primary database nodes. In order to be able to process read transactions, non-primary database nodes read a database log that is produced by the primary database node that describes database operations performed by that primary database node. As the non-primary database nodes read that database log, they replay the database operations, which can include inserting new records into their in-memory cache. During the operation of the database system, the primary database node might become unavailable (e.g., because it crashed). As a result, one of the non-primary database nodes may be restarted to become a new primary database node. But when restarting, that database node clears the memory that underlies its in-memory cache, causing the records stored therein to be deleted. Before being able to fulfill the role of the primary database node, the restarted database node has to rebuild its in-memory cache based on the database log. But the process of rebuilding the in-memory caches takes a considerable amount of time and thus a service-level agreement regarding an allowable amount of downtime might not be met. This disclosure addresses, among other things, the problem of how to restart a database node in a more efficient manner, such that it can be brought back up to speed to fulfill its obligations in accordance with a service-level agreement.

The present disclosure describes various techniques for preserving certain information (e.g., records stored in an in-memory cache) of a database node in such a way that the database node can be restarted without losing much (if any) of its progress. In various embodiments that are described below, a system comprises multiple node clusters that each have a set of database nodes. One of the node clusters may be designated a primary node cluster and include a primary database node and the other node clusters are designated non-primary node clusters and include non-primary database nodes. Upon starting up, in various embodiments, a database node may allocate multiple memory segments for facilitating its operation within the system. One of the memory segments is a restart segment that can be used to house an in-memory cache in which records are stored as a part of processing database transactions. In various embodiments, non-primary database nodes spawn their own set of processes to read a database log of the primary database node and replay log records of the database log in order to update their restart segment to store a set of records of the database. During operation of the system, a database node may determine to perform a restart operation to transition from a first database mode (e.g., being a secondary database node) to a second database mode (e.g., being a primary database node). In some cases, a database node may restart to transition from being a secondary database node of a secondary cluster to a secondary database node of a primary cluster.

As part of performing the restart operation, in various embodiments, the database node ceases reading the database log at a stop position and then stores, based on that stop position, database state information that enables its set of processes to resume reading the database log from the stop position. Before terminating that set of processes, the database node may permit queues that store log records read from the transaction log to be drained. Thereafter, in various embodiments, the database node terminates the processes and deallocates the multiple memory segments (that were previously allocated for the operation of the database node)

expect for the restart segment, which is preserved. After performing the restart operation, the database node reallocates the deallocated memory segments and spawns the set of processes. Those processes access the stored database state information and then resume reading the database log from the stop position and replaying log records. As a result of preserving the restart segment (and thus its in-memory cache and the database state information), the database node is able to be brought back up to speed more quickly in order to fulfill its obligations.

These techniques may be advantageous as they enable a quicker failover from a primary database node to a non-primary database node. In particular, certain agreements can be in place regarding the availability of a service. When the primary database node becomes unavailable (e.g., a network crash), functionality of the service becomes unavailable. In order to meet the agreements regarding availability, it is desirable to quickly failover from the primary database node to a non-primary database node such that the non-primary database node can become the primary database node. By preserving the non-primary database node's in-memory cache and maintaining database state information about the current state of the in-memory cache, the non-primary database node is able to be restarted more quickly to become a primary database node than it otherwise would be. These techniques can also be extended to cases in which there are multiple database node clusters, one of which may be a primary cluster and the others may be secondary clusters. The primary cluster might become unavailable and thus it may be desirable to failover from the primary cluster to a secondary cluster. Using the disclosed techniques, the database nodes of that secondary cluster may be restarted more quickly to take on the role of the prior primary cluster. An exemplary application of these techniques will now be discussed, starting with reference to FIG. 1.

Figure 5:
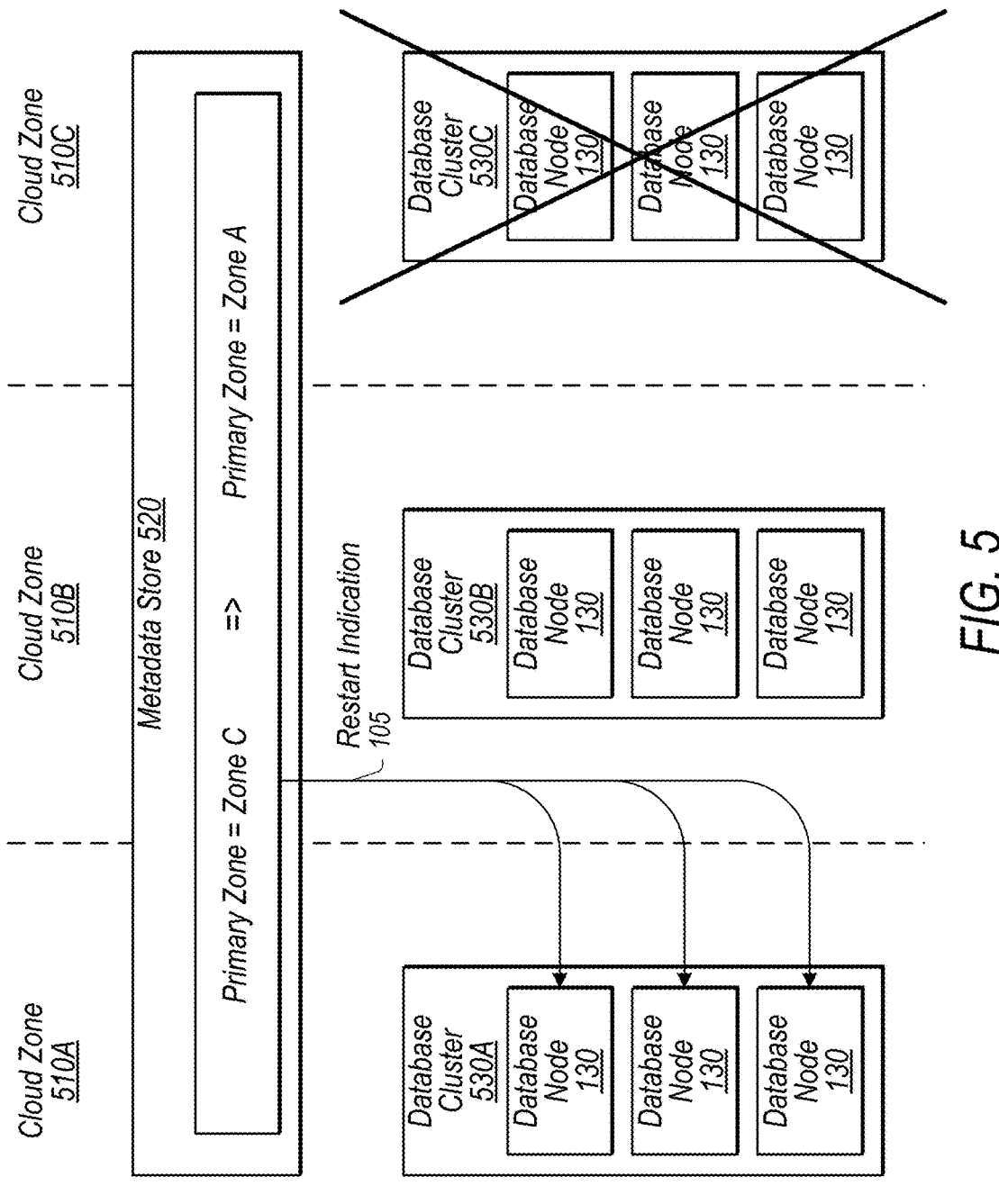
FIG. 5 is a block diagram illustrating example elements of a failover operation in which a database cluster having database nodes is restarted, according to some embodiments.

Turning now to FIG. 1, a block diagram of a system 100 is shown. System 100 includes a set of components that may be implemented via hardware or a combination of hardware and software routines. In the illustrated embodiment, system 100 includes a database store 110 and a database node 130 that can access database store 110. As shown, database store 110 includes data records 115 and a database log 120 that comprises log records 125, and database node 130 includes an orchestration process 135, memory segments 140, and worker processes 150. Also as illustrated in FIG. 1, memory segments 140 include temporary memory segments 142 and a restart memory segment 144 having data records 115 and database state information 155. In some embodiments, system 100 is implemented differently than shown. For example, system 100 may comprise multiple node clusters spread across multiple zones (as depicted in FIG. 5), database state information 155 may be stored at database store 110, database log 120 might be stored at separate store from data records 115, etc.

System 100, in various embodiments, implements a platform service (e.g., a customer relationship management (CRM) platform service) that allows users of that service to develop, run, and manage applications. System 100 may be a multi-tenant system that provides various functionality to users/tenants hosted by the multi-tenant system. Accordingly, system 100 may execute software routines from various, different users (e.g., providers and tenants of system 100) as well as provide code, web pages, and other data to users, stores, and other entities that are associated with system 100. In various embodiments, system 100 is implemented using a cloud infrastructure that is provided by a cloud provider. Accordingly, database store 110 and database node 130 may utilize the available cloud resources of that cloud infrastructure (e.g., computing resources, storage resources, etc.) in order to facilitate their operation. For example, database node 130 may execute within a virtual environment hosted on server-based hardware included in a datacenter. But in some embodiments, system 100 is implemented using a local or private infrastructure as opposed to a public cloud.

Database store 110, in various embodiments, includes a collection of information that is organized in a manner that allows for access, storage, and manipulation of that information. Database store 110 may include supporting software (e.g., storage nodes) that enables database node 130 to carry out those operations (e.g., accessing, storing, etc.) on the information that is stored at database store 110. In various embodiments, database store 110 is implemented using a single or multiple storage devices that are connected together on a network (e.g., a storage attached network (SAN)) and configured to redundantly store information in order to prevent data loss. The storage devices may store data persistently and therefore database store 110 may serve as a persistent storage for system 100. In various embodiments, data written to database store 110 by database node 130 is accessible to other database nodes 130 within a multi-node configuration (e.g., a database node cluster or a system having multiple database node clusters spread across different zones provided by a cloud provider).

In various embodiments, database store 110 stores two main types of files (also herein referred to as "extents"): a data file and a log file. A data file may comprise the actual data and may be append-only such that new data records 115 are appended to the data file until its size reaches a threshold and another data file is created. A data record 115, in various embodiments, comprises data and a database key that is usable to look up that data record 115. For example, a data record 115 may correspond to a row in a database table where the record specifies values for attributes of the database table. A log file may comprise log records 125 describing database modifications (e.g., record insertions) made as a result of executing database transactions. As with data files, a log file may be append-only and continuously receive appends as transactions do work. In various embodiments, database log 120 is a set of log files having log records 125 that collectively identify a state of the database system implemented by system 100. As such, by reading database log 120, database node 130 may determine an ordering in which database operations were performed, including an ordering in which transactions were committed within system 100. Data files and log files, in various embodiments, are associated with file identifiers that can be used to locate them. Consequently, database node 130 may access data records 115 and log records 125 from database store 110 by issuing access requests having file identifiers to the storage nodes that implement database store 110.

Database node 130, in various embodiments, facilitates database services, such as data retrieval, data manipulation, and data storage. In various embodiments, database node 130 is software that is executable on hardware, while in some embodiments, it encompasses both the hardware and the software. The database services may be provided to components internal and external to system 100. For example, database node 130 may receive a transaction request from an application node to perform a database transaction. A database transaction is a logical unit of work (e.g., a specified set of database statements) to be performed in relation to a database of system 100. As an example, processing a database transaction may include executing a SQL SELECT statement to select one or more rows of table. The contents of a row may be specified in a data record 115 and thus database node 130 may return one or more requested data records 115 that correspond to those one or more rows.

In various embodiments, database node 130 can operate in at least two different modes: a read mode and a write mode. When operating in the write mode, database node 130 can write data records 115 for the database of system 100. In particular, write transactions may be routed to database node 130 that involve writing data records 115. Consequently, database node 130 may write those data records 115 into an in-memory cache that stores its data in restart memory segment 144. In various embodiments, database node 130 also generates log records 125 that identify the database operations (e.g., insert, delete, etc.) performed by database node 130 and appends them to database log 120. After writing data records 115 to restart memory segment 144, database node 130 may flush those data records 115 to database store 110 by writing them into data files that are stored at database store 110. In addition to processing write transactions, database node 130 can also process read-only transactions (i.e., transactions that do not involve writing data records 115) when operating in the write mode. A database node 130 that operates in the write mode can be referred to as a "primary" database node.

When operating in the read mode, in various embodiments, database node 130 cannot write data records 115 but can access and return them. Thus, certain read transactions may be routed to database node 130 to offload work from a primary database node 130. In order to be able to return data records 115 that are stored at a primary database node 130 but not stored in database store 110, in various embodiments, database node 130 reads database log 120 (when operating in the read mode) and replays log records 125 to recreate the state of the in-memory cache of the primary database node 130. As a result, database node 130 may return data records 115 from its in-memory cache (which is implemented via restart memory segment 144) as part of processing particular read transactions. A database node 130 that operates in the read mode can be referred to as a "secondary" database node. To facilitate the operations of database node 130 in either the read or write mode, database node 130 may execute orchestration process 135 and worker processes 150.

Orchestration process 135, in various embodiments, is a computer process that allocates memory segments 140 and spawns worker processes 150 that implement the database services provided by database node 130. Orchestration process 135 may be instantiated when database node 130 is initially started up or as part of starting a database service. After being instantiated, orchestration process 135 may allocate memory segments 140 before spawning a set of worker processes 150. A given memory segment 140, in various embodiments, is a portion of memory that is allocated on a memory device (e.g., random access memory) and can be used by worker processes 150 to store data. As depicted, orchestration process 135 allocates a set of temporary memory segments 142 and restart memory segment 144. One difference between the two types of memory segments is that restart memory segment 144 is not deallocated during a soft restart operation, discussed further below. Consequently, a temporary memory segment 142 may be used to store items (e.g., query plans, table locks, etc.) that facilitate the operation of a database service but are less desired (e.g., from the perspective of database operator) to preserve during a database node restart. In contrast, restart memory segment 144 may be used to store records 115 and other information that is more desired to preserve during a database node restart. After allocating memory segments 140, orchestration service 135 may then spawn worker processes 150—in some cases, orchestration service 135 spawns a single worker process 150 that spawns other worker processes 150.

Worker processes 150, in various embodiments, are computer processes that facilitate the operations of the database service. The actions performed by worker processes may depend on the database mode in which database node 130 is operating. As an example, when operating in the read mode, worker processes 150 may include a first set of processes that read database log 120 and provide log records 125 to a second set of processes that replay those log records 125, which includes writing data records 115 to restart memory segment 144 as shown. When operating in the write mode, worker processes 150 may write log records 125 to database log 120 instead of reading log records 125 in order to replay them. In various embodiments, worker processes 150 include processes that purge data (e.g., data records 115) from memory segments 140, merge data records 115 from different levels of a log-structured merge tree (an LSM tree), and other database maintenance operations. Examples of worker processes 150 are discussed in more detail with respect to FIG. 2.

In various embodiments, orchestration process 135 can perform a soft restart operation for database node 130 in which it terminates worker processes 150 and deallocates temporary memory segments 142 but preserves restart memory segment 144. As a result, the data stored in those temporary memory segments 142 is lost, but the data stored in restart memory segment 144 is preserved. In various embodiments, a soft restart operation is performed in response to receiving a restart indication 105 that indicates that a database node 130 has been promoted to become a primary database node. By preserving the data stored in restart memory segment 144 and storing database state information 155 that details the state of that data, that database node 130 may become a primary database node more quickly. Examples of the information included in database state information 155 is discussed in more detail with respect to FIG. 3. An example soft restart operation is discussed in more detail with respect to FIGS. 4A-4B. In contrast to the soft restart operation, a hard restart operation involves orchestration process 135 deallocating all memory segments 140, including restart memory segment 144. In various embodiments, a hard restart operation is performed in response to determination to restart the database service.

Figure 2:
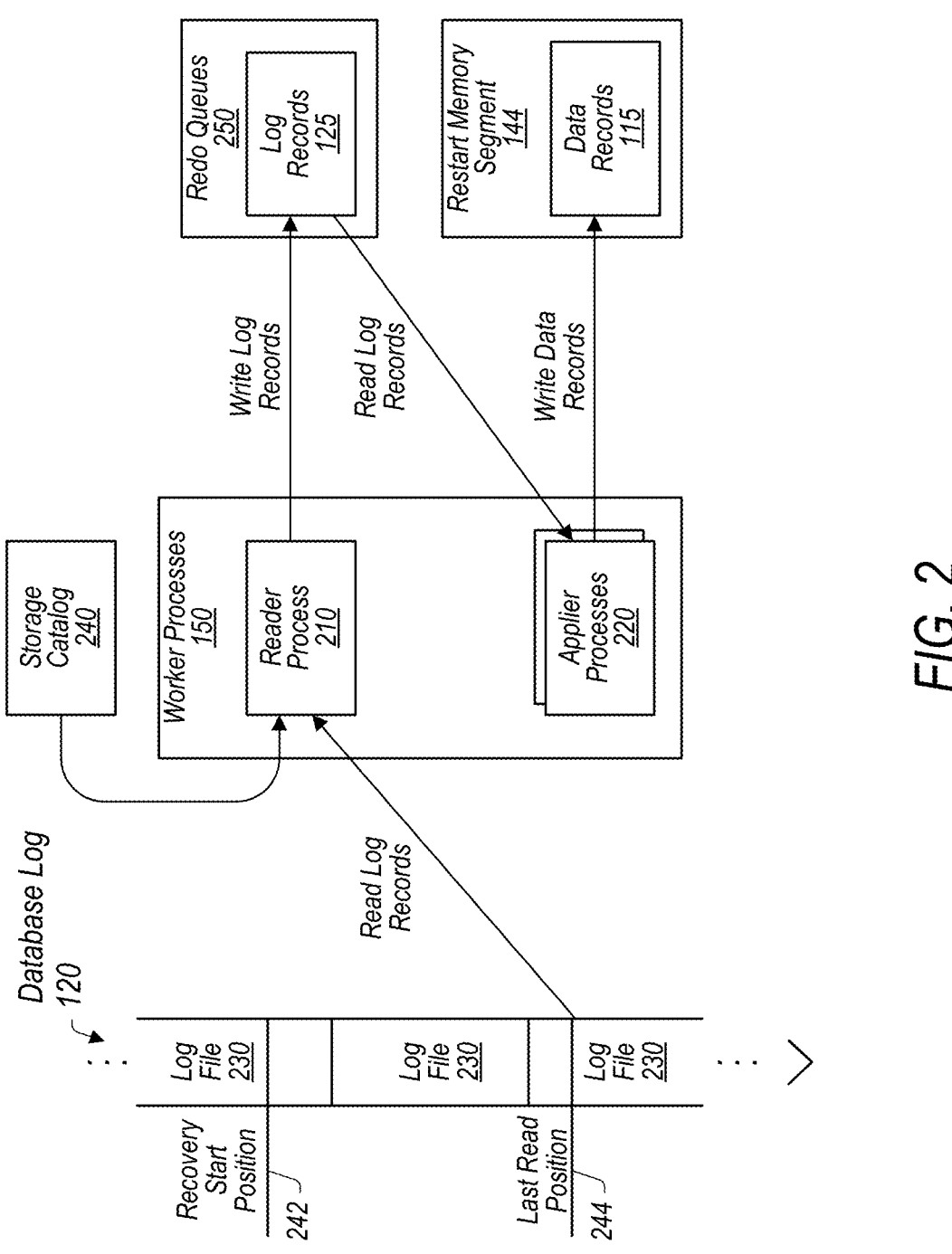
FIG. 2 is a block diagram that illustrates example elements of worker processes that can read and replay log records, according to some embodiments.

Turning now to FIG. 2, a block diagram of example worker processes 150 that can read and replay log records 125 is shown. In the illustrated embodiment, there is database log 120, restart memory segment 144, a set of worker processes 150, a storage catalog 240, and a set of redo queues 250. As further shown, database log 120 comprises log files 230 and is associated with a recovery start position 242 and a last read position 244. Also as shown, worker processes 150 include a reader process 210 and a set of applier processes 220. The illustrated embodiment may be implemented differently than shown—e.g., there may be multiple reader processes 210 that read from database log 120, worker processes 150 may include a purger process, etc.

As mentioned, orchestration service 135 may spawn one or more worker processes 150 to provide the database services of database node 130. In various embodiments, orchestration service 135 spawns reader process 210 and then reader process 210 spawns one or more applier processes 220—reader process 210 may also spawn other worker processes 150 (e.g., a purger process). In some embodiments, orchestration service 135 spawns both reader process 210 and one or more applier processes 220. Reader process 210 and applier processes 220 might not be spawned when database node 130 starts up in the aforementioned write mode.

Reader process 210, in various embodiments, is a computer process that reads database log 120 and enqueues log records 125 from database log 120 in redo queues 250. When reader process 210 is spawned, in various embodiments, it accesses storage catalog 240 to learn about database log 120. Storage catalog 240 includes information about database log 120, which may include the locations of log files 230-*a* log file 230 comprises a set of log records 125. When the primary database node 130 creates a log file 230, it may store information in storage catalog 240 that identifies the location of the log file 230. Accordingly, reader process 210 may access that information and then use it to begin reading log records 125 from that log file 230. In some cases, the primary database node 130 stores that information in storage catalog 240 after it has finished writing to that log file 230. In various embodiments, storage catalog 240 also specifies a recovery start position 242 that identifies where to begin reading from database log 120 upon database node 130 starting up from a cold start or a hard restart. The results (e.g., data records 115) associated with log records 125 occurring in database log 120 after recovery start position 242 may not be stored at database store 110 but instead still reside at the primary database node 130 and have not been flushed to database store 110. That is, in various embodiments, the log records 125 between recovery start position 242 and the end of database log 120 correspond to data records 115 that have not been persisted to database store 110.

After accessing the log information from storage catalog 240 about the locations of log files 230 and recovery start position 242, reader process 210 may begin accessing log records 125 from database log 120 based on recovery start position 242. As discussed in greater detail with respect to FIG. 4, subsequent to a soft restart, reader process 210 may begin accessing log records 125 from a recorded stop position that is different than recovery start position 242. As reader process 210 accesses log records 125, it writes them to redo queues 250, as shown. Redo queues 250, in various embodiments, are queues (e.g., first in, first out (FIFO) structures) that are implemented using the memory of one or more temporary memory segments 142 allocated by orchestration process 135.

Applier processes 220, in various embodiments, are computer processes that replay log records 125 accessed from redo queues 250. As mentioned, a log record 125 may identify one or more database operations (e.g., insert, update, etc.) that are performed by a primary database node 130 as part of processing database transactions. Accordingly, replaying a log record 125 includes performing the one or more database operations identified by that log record 125. As a result, an applier process 220 may insert data records 115 (e.g., the data record 115 resulting from an insert operation) into restart memory segment 144, as shown. In various embodiments, applier processes 220 replay log records in parallel, where a given applier process 220 replays the log records 125 from a particular database transaction. Consequently, multiple transactions can be replayed in parallel by using multiple applier processes 220.

Turning now to FIG. 3, a block diagram of example database store information 155 is shown. In the illustrated embodiment, database store information 155 includes a stop position 310, a flush transaction commit number (flush XCN) 320, a visible transaction commit number (visible XCN) 330, and purger state information 340. Database store information 155 may be implemented differently than shown. As an example, database store information 155 might not include purger state information 340.

Stop position 310, in various embodiments, specifies a position within database log 120 at which reader process 210 has stopped reading database log 120. As a part of database node 130 performing a soft restart, in various embodiments, reader process 210 is instructed to cease reading database log 120. Consequently, reader process 210 may record where it has stopped and then include that information in database state information 155 as stop position 310. Stop position 310 may specify the last read log record 125 or the last read fragment (a collection of log records 125) of database log 120. Stop position 310 may alternatively specify a log file 230 and an offset within that log file 230 corresponding to the last read position.

Flush XCN 320, in various embodiments, identifies the most recent transaction whose data records 115 have been flushed from database node 130 to database store 110. In particular, after a storage threshold has been reached in regards to an in-memory cache implemented using restart memory segment 144 (e.g., the in-memory cache is 80% full), database node 130 may perform a flush operation in which a set of committed data records 115 are written into database store 110 and then later removed from the in-memory cache by a purger process. In some cases, database node 130 may not wait for a threshold to be satisfied, but instead continually performs the flush operation as transactions are committed. The set of committed data records 115 that are flushed may correspond to those data records in the in-memory cache whose XCN is equal to or less than a specified XCN. Once the flush operation has been completed, flush XCN 320 may be updated by database node 130 to reflect the specified XCN. Accordingly, flush XCN 320, in various embodiments, is used by database node 130 to determine where (e.g., database store 110 or the in-memory cache) to access a data record 115 as part of processing a database transaction. As an example, if a query involves searching for a record with an XCN less than flush XCN 320, then database node 130 may search database store 110 but not the in-memory cache. Because flush XCN 320 indicates what has been flushed, in various embodiments, flush XCN 320 and stop position 310 together define a transaction window that indicates, for which transactions, there are data records 115 stored in restart memory segment 144.

Visible XCN 330, in various embodiments, identifies the most recent transaction whose data records 115 have been committed and therefore are visible outside of that transaction. In particular, data records 115 may be written to the in-memory cache implemented using restart memory segment 144. In various embodiments, before the corresponding transaction has been committed, those data records 115 are not accessible to other transactions or other components of system 100. As part of committing the transaction, those data records 115 are stamped with an XCN, and visible XCN 330 is updated to reflect that XCN until another transaction has been committed. Consequently, when searching for the latest version of a data record 115 to return for a key, database node 130 may not return any data record 115 associated with a transaction occurring after visible XCN 330—that is, visible XCN 330 indicates which data records 115 stored in restart memory segment 144 are accessible to queries executed at database node 130. By maintaining this information, worker processes 150 can determine, upon their instantiation after a soft restart, what the most recent committed transaction is at database node 130.

Purger state information 340, in various embodiments, is information that allows for a purger process of worker processes 150 to resume a purge operation. As mentioned, after data records 115 have been flushed to database store 110, they are purged from database node 130 in a purge operation. When database node 130 is preparing to perform a soft restart, the purge process may be in the middle of the purge operation. In a similar manner to reader process 210, in various embodiments, the purge process stores purger state information 340 about the state of the purge operation that it is performing so that it may resume the purge operation after the soft restart. Purger state information 340 may specify a XCN range and the most recent XCN purged from database node 130. The XCN range may identify a range of XCN for which data records 115 having an XCN in that range are purged in the purge operation. The purge process may start with data records 115 belonging to the lowest XCN of the range and work towards data records 115 belonging to the highest XCN. In various embodiments, the most recent XCN corresponds to an XCN in the XCN range whose records have been purged. Accordingly, the most recent XCN may serve as a purge stop position that can be used by the purge process to resume the purge operation.

Figure 4A:
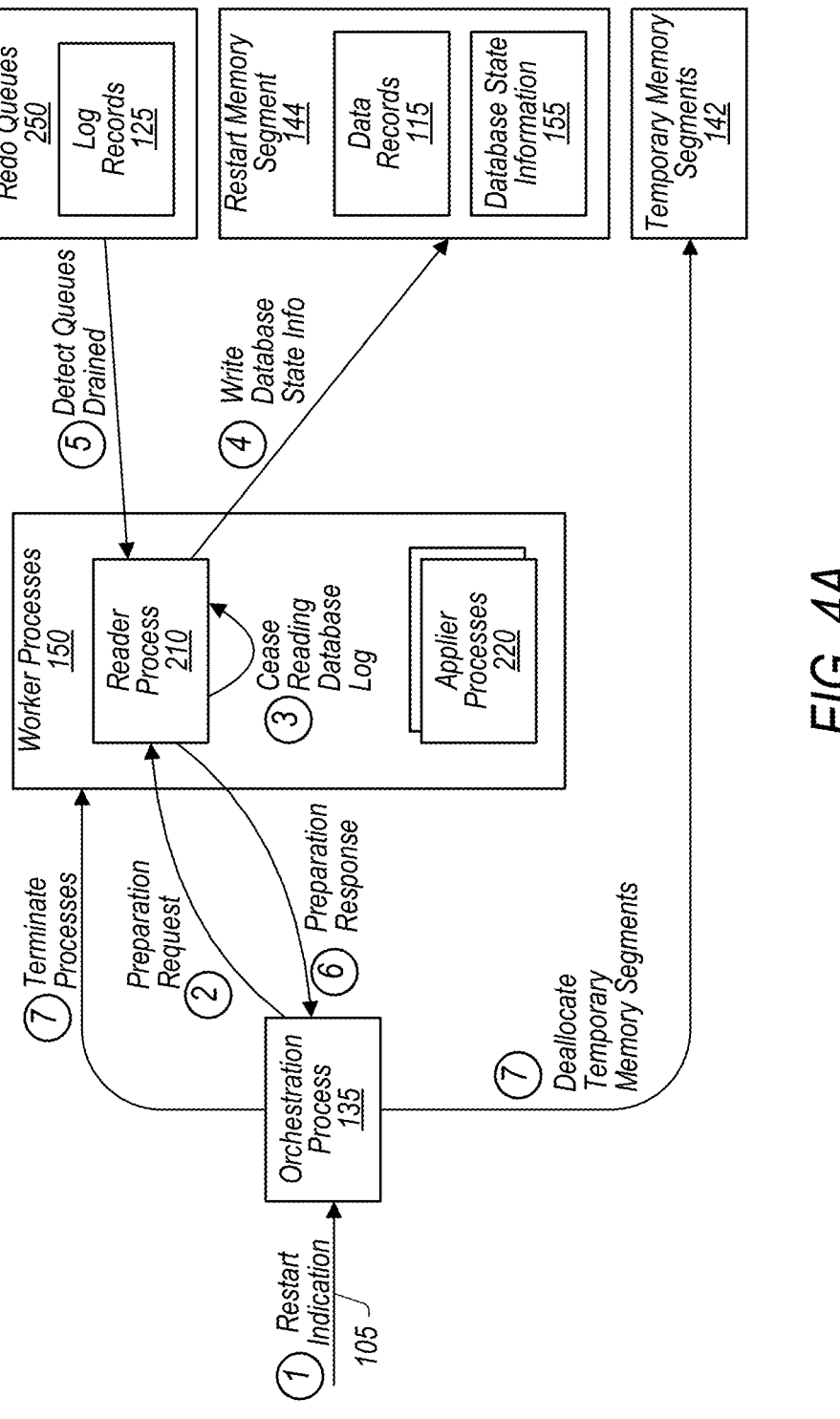
FIGS. 4A-B are block diagrams illustrating example elements of a soft restart operation performed by a database node, according to some embodiments.
Figure 4B:
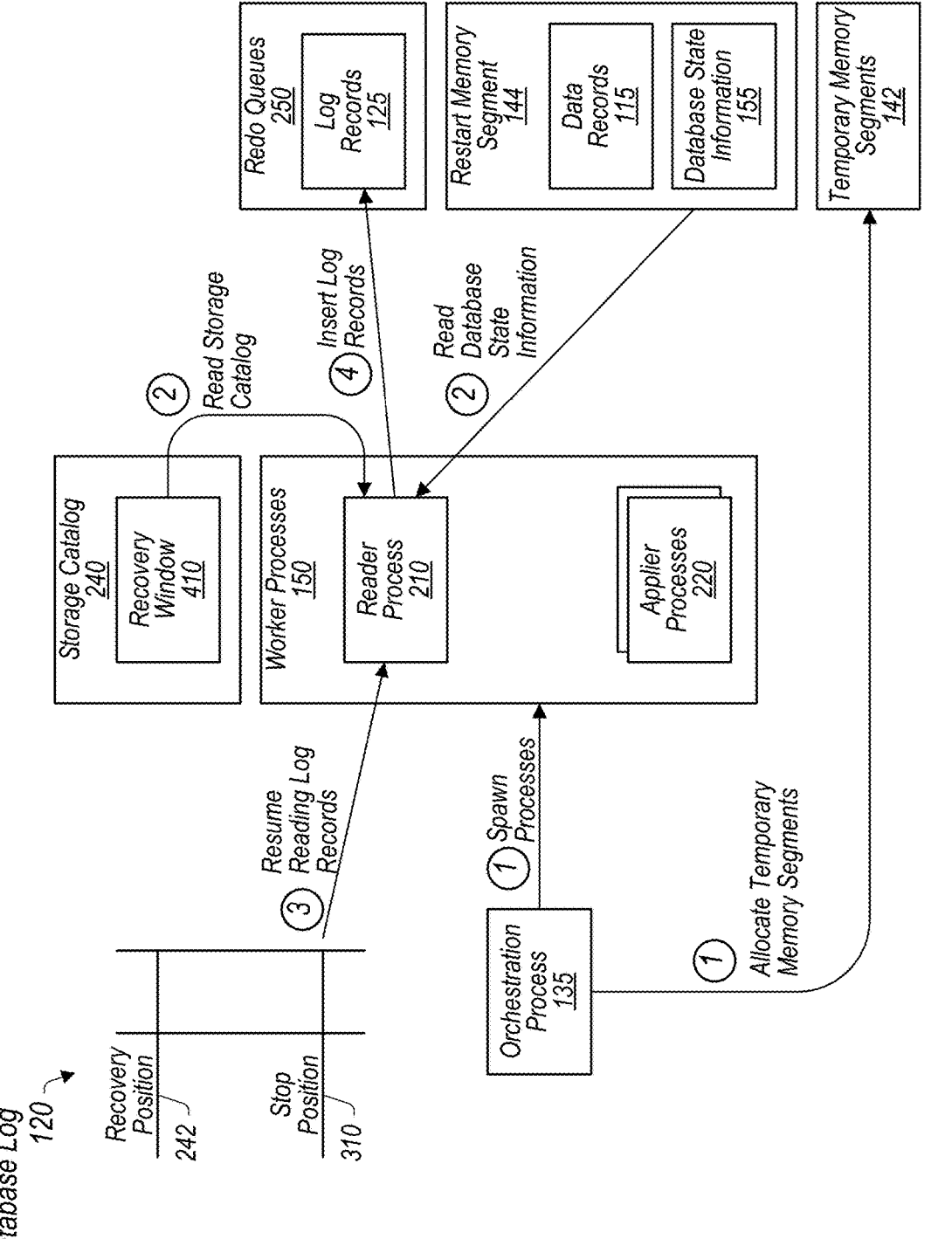

Turning now to FIG. 4A-B, block diagrams of a soft restart operation of a database node 130 is shown. In FIG. 4A, there is orchestration process 135, worker processes 150, temporary memory segments 142, restart memory segment 144, and redo queues 250. As shown, worker processes 150 include reader process 210 and a set of applier processes 220. The illustrated embodiment may be implemented differently than shown. For example, worker processes 150 may include a purger process that removes data records 115 from restart memory segment 144, a merger process that merges data records 115 of an LSM tree implemented at database store 110, etc.

As shown, orchestration process 135 initially receives a restart indication 105. A restart indication 105 may be a request from another component of system 100, a request from a user, or orchestration process 135 may poll a metadata store and receive an indication that it should restart (e.g., it has been promoted). In response, orchestration process 135 may begin the restart operation by issuing a preparation request to reader process 210 to prepare itself for termination as part of the soft restart operation. Upon receiving the preparation request, reader process 210 then ceases reading database log 120 and enqueuing log records 125. In various embodiments, reader process 210 ceases reading after finishing a portion of database log 120 (e.g., a block of log records 125, a log file 230, etc.). In some embodiments, reader process 210 ceases reading at or near the log record 125 that it was reading when it received the preparation request. After ceasing reading of database log 120, reader process 210 records a stop position 310 and stores it in restart memory segment 144 as a part of database state information 155.

Reader process 210 further waits for redo queues 250 to empty, which indicates that all log records 125 read from database log 120 have been replayed by applier processes 220. Thus, the state of restart memory segment 144 may be consistent with the recorded stop position 310. After reader process 210 has detected that redo queues 250 have been drained, reader process 210 may store, as a part of database state information 155, a visible XCN 330 associated with an in-memory cache implemented using restart memory segment 144. Reader process 210 may also wait for any active flush operations to complete and then store a flush XCN 320 associated with the last completed flush operation. In some embodiments, reader process 210 waits for a purger process to store purger state information 340. Once reader process 210 has determined it is prepared to be terminated, reader process 210 issues a preparation response to orchestration process 135.

In response to receiving the preparation response, orchestration process 135 terminates worker processes 150 (which can include database processes that are processing transactions) and deallocates temporary memory segments 142. To terminate worker process 150, in various embodiments, orchestration process 135 issues a terminate signal to worker processes 150 that causes them to terminate gracefully. Once those worker processes 150 have terminated and the temporary memory segments 142 have been deallocated, orchestration process 135 may begin a boot-up process, as shown in FIG. 4B.

In FIG. 4B, there is database log 120, orchestration process 135, worker processes 150, temporary memory segments 142, restart memory segment 144, storage catalog 240, and redo queues 250. As depicted, restart memory segment 144 includes data records 115 and database state information 155, worker processes 150 include reader process 210 and applier processes 220, storage catalog 240 includes a recovery window 410, and redo queues 250 include log records 125. The illustrated embodiment may be implemented differently than shown. As an example, worker processes 150 may include a purger process, a merger process, etc.

As shown, orchestration process 135 initially spawns worker process 150 and allocates temporary memory segments 142. Since a soft restart is being performed, orchestration process 135 does not reallocate restart memory segment 144 since it was preserved. But if a hard restart is performed, then orchestration process 135 may allocate all memory segments 140. In some embodiments, orchestration process 135 spawns reader process 210, which then spawns applier processes 220. After being spawned, reader process 210 may access database state information 155 and information from storage catalog 240 that describes recovery window 410. Recovery window 410, in various embodiments, identifies information (e.g., recovery position 242, log files 230, etc.) that facilities the reading of database log 120. In various embodiments, reader process 210 updates recovery window 410 using database state information 155 by replacing recovery position 242 with stop position 310. Reader process 210 may further update recovery window 410 based on flush XCN 320 and visible XCN 330. Reader process 210 may then start reading database log 120 from stop position 310 instead of recovery position 242 and inserting log records 125 into redo queues 250.

Turning now to FIG. 5, a block diagram of an example cloud environment 500 is shown. In the illustrated embodiments, cloud environment 500 includes cloud zones 510A-C that each include a respective database cluster 530 (i.e., database cluster 530A-C respectively). Also as shown, cloud environment 500 includes a metadata store 520 that is implemented across cloud zones 510A-C. In some embodiments, cloud environment 500 is implemented differently than shown. As an example, cloud environment 500 may include a cloud zone 510 that has multiple database clusters 530.

Cloud environment 500, in various embodiments, is a cloud infrastructure that includes various components (e.g., hardware, virtualized resources, storage, and network resources) for providing cloud computing services to users. In some cases, cloud environment 500 may be a public cloud provided by a cloud provider to multiple customers that implements their systems using the various components/ resources of the public cloud; in other cases, cloud environment 500 is a private cloud that is available to only select users instead of the general public. In some embodiments, cloud environment 500 is spread across various geographical locations and each location may define a "region" of cloud environment 500. Within a given region, there may be one or more cloud zones 510. As an example, cloud zones 510A-C might be a part of the same region, although they can be in separate regions. A cloud zone 510, in various embodiments, is a logical or physical grouping of components (e.g., computing resources, storage resources, etc.) within a region. In many cases, the components of a cloud zone 510 are isolated from the failures of components in other cloud zones 510. For example, cloud zone 510A may be a first data center in a particular region and cloud zone 510B may be a second data center in that same region. Cloud zone 510A may be isolated from cloud zone 510B such that a failure at the data center of cloud zone 510B does not affect the data center of cloud zone 510A. In some cases, cloud zones 510A and 510B might be the same data center but correspond to components on separate networks such that one cloud zone 510 might not be affected by the other cloud zone 510.

Metadata store 520, in various embodiments, is a repository that stores metadata, which can pertain to the operation of a database service. In particular, database clusters 530A-C may collectively implement a database service and use metadata store 520 as a repository of at least of portion of the metadata used to facilitate the operation of the database service. Accordingly, the metadata that is written to metadata store 520 by one database node 130 may be accessible to other database nodes 130 of database clusters 530. To facilitate this, in various embodiments, each cloud zone 510 executes an instance of metadata store 520 that communicates with other instances of metadata store 520. Accordingly, metadata written to one instance may be synced with the other instances in order to create a consistent view of metadata store 520. For example, a database node 130 of database cluster 530A may write metadata to its instance of metadata store 520 and then that metadata may be synced with an instance in cloud zone 510C so that a database node 130 of cloud zone 510C can access the metadata. In various embodiments, one piece of metadata stored by metadata store 520 is an indication of which database cluster 530 is the primary database cluster and which database clusters 530 are secondary database clusters of the database service.

As shown in FIG. 5, metadata store 520 initially indicates that database cluster 530C is the primary database cluster and thus is responsible for handling transactions that involve write operations, in various embodiments. During operation of the database service, cloud zone 520C or database cluster 530C may become unavailable. For example, power may be lost to the data center of cloud zone 520C. In order to avoid long downtimes of the database service, in various embodiments, another service (not shown) selects one of the other cloud zones 510 to become the primary cloud zone with the primary database cluster. The selection may be based on a set of characteristics of the cloud zones 510 (e.g., the cloud zone 510 with the lowest unavailability in cloud environment 500) or it might be random. After selecting a cloud zone 510, the service updates metadata store 520 to reflect the new selection and that information is synced across the cloud zones 510. As shown, metadata store 520 is updated to indicate that cloud zone 510A has become the new primary cloud zone and thus database cluster 530A should be the primary database cluster.

In various embodiments, a database node 130 periodically polls metadata store 520 for certain information, which includes the indication of which database cluster 530 is the primary database cluster—that indication can serve as restart indication 105 when there is a difference between what a given database node 130 expects and what is actually indicated. In particular, in response to observing that cloud zone 510A has become the primary cloud zone, the database nodes 130 of database cluster 530A may perform the soft restart operation disclosed herein. At least one of the database nodes 130 may become a primary node and the other database nodes 130 may become secondary nodes within the primary database cluster.

Figure 6:
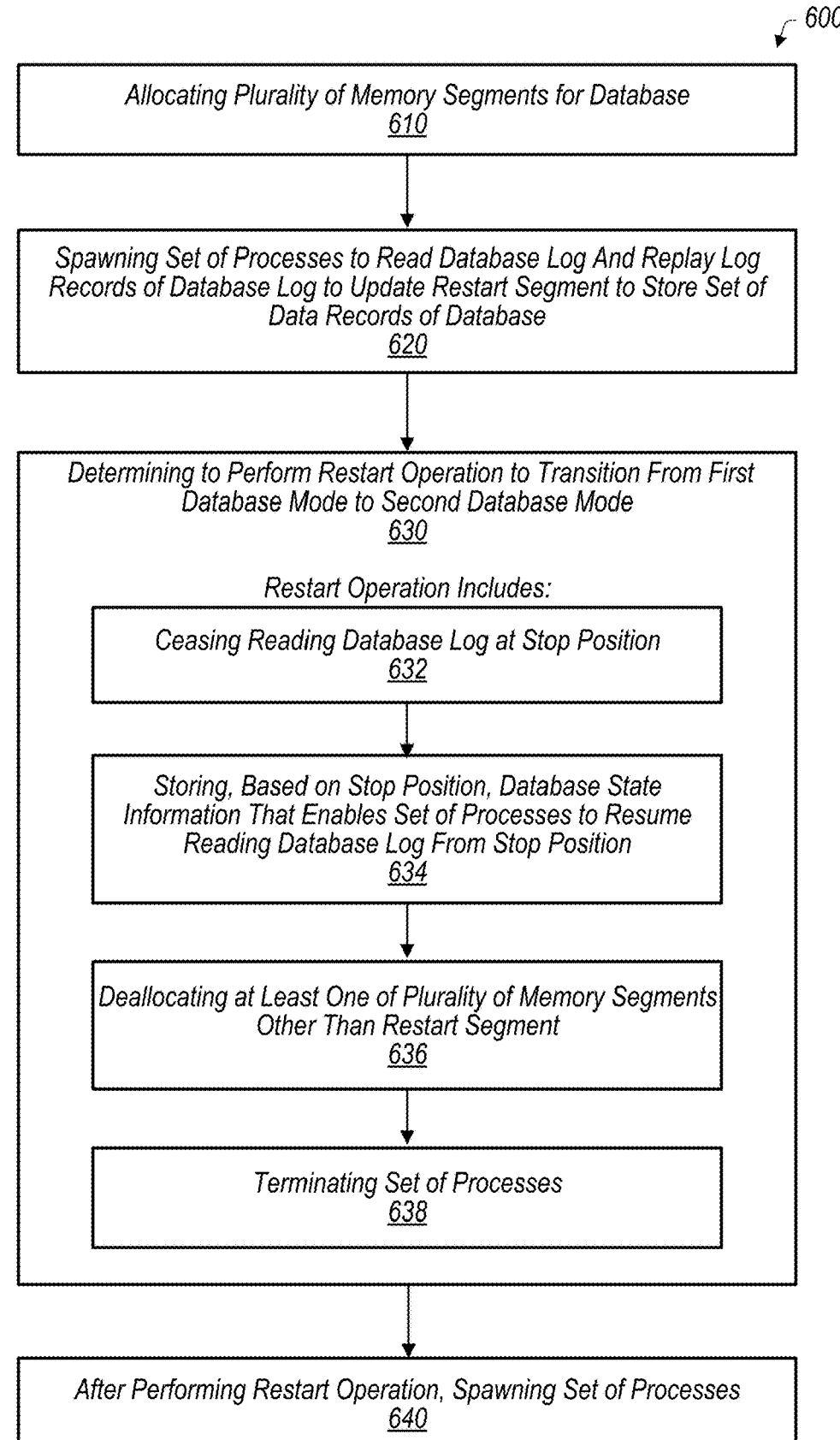
FIG. 6 is a flow diagram illustrating example method relating to a soft restart operation performed by a database node, according to some embodiments.

Turning now to FIG. 6, a flow diagram of a method 600 is shown. Method 600 is one embodiment of a method performed by a computer system (e.g., system 100) to perform a soft restart operation. Method 600 may be performed by executing program instructions stored on a non-transitory computer-readable medium. In some embodiments, method 600 includes more or less steps than shown. For example, method 600 may include a step in which the computer system ceases processing database transactions.

Method 600 begins in step 610 with the computer system allocating a plurality of memory segments (e.g., memory segments 140) for a database. In various embodiments, the plurality of memory segments includes a restart segment (e.g., restart memory segment 144) that can be used to store data records (e.g., data records 115). In step 620, the computer system spawns a set of processes (e.g., worker processes 150) to read a database log (e.g., database log 120) and replay log records (e.g., log records 125) of the database log to update the restart segment to store a set of data records of the database. In various embodiments, the set of processes includes a process (e.g., reader process 210) that is operable to read the database log and enqueue log records in a set of queues (e.g., redo queues 250) accessible to other ones of the set of processes (e.g., applier processes 220) that are operable to apply the enqueued log records.

In step 630, the computer system determines to perform a restart operation to transition the computer system from a first database mode to a second database mode. The computer system may access node cluster metadata from a metadata store (e.g., metadata store 520) that is separate from the database node. The node cluster metadata may identify a primary node cluster from a plurality of node clusters (e.g., database clusters 530) that implement a database service. The determining to perform the restart operation may be in response to determining that a node cluster having the computer system has become the primary node cluster. In some cases, the determining to perform the restart operation is in response to the computer system receiving a request to perform the restart operation. In various embodiments, the first database mode corresponds to a read mode in which the computer system processes read transactions but not write transactions, and the second database mode corresponds to a write mode in which the computer system processes read and write transactions.

As a part of performing the restart operation, in step 632, the computer system ceases reading the database log at a stop position (e.g., a stop position 310). In step 634, the computer system stores, based on the stop position, database state information (e.g., database state information 155) that enables the set of processes to resume reading the database log from the stop position. The database state information may specify a flush commit number (e.g., a flush transaction commit number 320) that indicates transactions whose data records have been written to a persistent storage (e.g., database store 110) separate from the database node. The stop position and the flush commit number may define a transaction window that indicates, for which transactions, there are data records stored in the restart segment. The database state information may specify a read commit number (e.g., a visible transaction commit number 330) that indicates which data records stored in the restart segment are accessible to queries of the database node. In various embodiments, the database state information is stored in the restart segment.

In step 636, the computer system deallocates at least one (e.g., a temporary memory segment 142) of the plurality of memory segments other than the restart segment. In various cases, all of the plurality of memory segments other than the restart segment are deallocated as a part of the deallocating. In step 638, the computer system terminates the set of processes. The deallocating and the terminating may be performed after a determination that the set of queues have been drained of log records In step 640, after performing the restart operation, the computer system spawns the set of processes. The set of processes may be operable to resume reading of the database log based on the database state information. In some embodiments, the set of processes includes a process that is operable to, after being spawned subsequent to the restart operation access recovery metadata (e.g., recovery window 410) from a catalog store (e.g., storage catalog 240) that is separate from the database node. The recovery metadata may specify a recovery position (e.g., a recovery position 242) from which to read the database log and merge the stop position with information of the recovery metadata such that the process reads the database log from the stop position instead of the recovery position. After performing the restart operation, the computer system may allocate the at least one memory segment but not the restart segment In various embodiments, the computer system stores purger state information (e.g., purger state information 340) that identifies a purge stop position in a purge process involving purging data records from the database node. The set of processes may be operable to, after being spawned subsequent to the restart operation, resume the purge process from the purge stop position. The purger state information may identify a purge commit number that indicates a most recent transaction whose records have been purged from the computer system.

Exemplary Computer System

Figure 7:
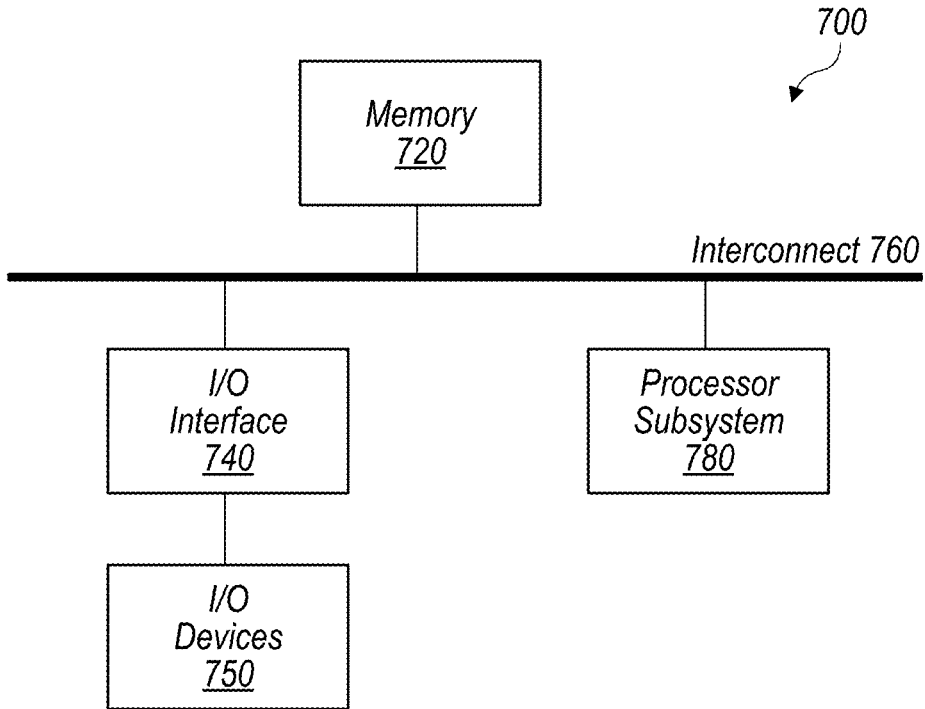
FIG. 7 is a block diagram illustrating elements of a computer system for implementing various systems described in the present disclosure, according to some embodiments.

Turning now to FIG. 7, a block diagram of an exemplary computer system 700, which may implement system 100, database store 110, or database node 130, is depicted. Computer system 700 includes a processor subsystem 780 that is coupled to a system memory 720 and I/O interfaces(s) 740 via an interconnect 760 (e.g., a system bus). I/O interface(s) 740 is coupled to one or more I/O devices 750. Although a single computer system 700 is shown in FIG. 7 for convenience, system 700 may also be implemented as two or more computer systems operating together.

Processor subsystem 780 may include one or more processors or processing units. In various embodiments of computer system 700, multiple instances of processor subsystem 780 may be coupled to interconnect 760. In various embodiments, processor subsystem 780 (or each processor unit within 780) may contain a cache or other form of on-board memory.

System memory 720 is usable store program instructions executable by processor subsystem 780 to cause system 700 perform various operations described herein. System memory 720 may be implemented using different physical memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on. Memory in computer system 700 is not limited to primary storage such as memory 720. Rather, computer system 700 may also include other forms of storage such as cache memory in processor subsystem 780 and secondary storage on I/O Devices 750 (e.g., a hard drive, storage array, etc.). In some embodiments, these other forms of storage may also store program instructions executable by processor subsystem 780. Program instructions that, when executed, implement orchestration process 135 and/or worker processes 150 may be included/stored within system memory 720.

I/O interfaces 740 may be any of various types of interfaces configured to couple to and communicate with other devices, according to various embodiments. In one embodiment, I/O interface 740 is a bridge chip (e.g., Southbridge) from a front-side to one or more back-side buses. I/O interfaces 740 may be coupled to one or more I/O devices 750 via one or more corresponding buses or other interfaces. Examples of I/O devices 750 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 700 is coupled to a network via a network interface device 750 (e.g., configured to communicate over WiFi, Bluetooth, Ethernet, etc.).

The present disclosure includes references to "embodiments," which are non-limiting implementations of the disclosed concepts. References to "an embodiment," "one embodiment," "a particular embodiment," "some embodiments," "various embodiments," and the like do not necessarily refer to the same embodiment. A large number of possible embodiments are contemplated, including specific embodiments described in detail, as well as modifications or alternatives that fall within the spirit or scope of the disclosure. Not all embodiments will necessarily manifest any or all of the potential advantages described herein.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation-

[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

What is claimed is:

1. A method for restarting a database node of a database system, the method comprising:
    allocating, by the database node, a plurality of memory segments in a physical memory of the database node;
    inserting, by the database node, database records into one or more of the plurality of memory segments, wherein the inserting includes reading a database log written by another database node;
    performing, by the database node, a restart operation to transition from a read mode to a write mode in which the database node is permitted to process write transactions, wherein the restart operation includes:
        storing, in a restart memory segment of the plurality of memory segments, database state information that identifies a stop position at which the database node stopped reading the database log; and
        deallocating at least one of the plurality of memory segments other than the restart memory segment; and
    after performing the restart operation, the database node resuming reading of the database log based on the stop position identified by the database state information.

2. The method of claim 1, wherein the restart operation further includes:
    storing, in the restart memory segment, purger state information that identifies a purge stop position in a purge operation that involves purging database records from the database node; and
    wherein the method further comprises, after performing the restart operation, the database node resuming the purge operation from the purge stop position identified by the purger state information.

3. The method of claim 1, wherein all of the plurality of memory segments other than the restart memory segment are deallocated as a part of the deallocating.

4. The method of claim 1, further comprising:
    spawning, by the database node, a set of processes to read the database log and replay log records of the database log to update the restart memory segment to store a set of database records, wherein the restart operation includes terminating the set of processes.

5. The method of claim 4, wherein the resuming reading of the database log includes:
    after performing the restart operation, spawning the set of processes to resume reading the database log based on the stop position.

6. The method of claim 4, wherein the set of processes includes a process that is operable to read the database log and enqueue log records in a set of queues accessible to other ones of the set of processes that are operable to apply the enqueued log records, and
    wherein the deallocating and the terminating are performed after a determination that the set of queues has been drained of log records.

7. The method of claim 1, further comprising:
    accessing, by the database node, node cluster metadata from a metadata store separate from the database node, wherein the node cluster metadata identifies a primary node cluster from a plurality of node clusters that collectively implement a database service, and
    wherein the performing of the restart operation is in response to determining that a node cluster having the database node has become the primary node cluster.

8. The method of claim 1, wherein the database records are inserted into the restart memory segment, and wherein the at least one memory segment stores a set of query plans and a set of database locks.

9. The method of claim 1, further comprising:
    after performing the restart operation, the database node:
        accessing log information from a catalog store separate from the database node, wherein the log information identifies a storage location of the database log; and
        accessing log records of the database log from the storage location.

10. A non-transitory computer readable medium having program instructions stored thereon that are capable of causing a computer system to perform operations comprising:
    allocating a plurality of memory segments in a physical memory of the computer system;
    inserting database records into one or more of the plurality of memory segments, wherein the inserting includes reading a database log;
    performing a restart operation to transition from a read mode to a write mode in which the computer system is permitted to process write transactions, wherein the restart operation includes:
        storing, in a restart memory segment of the plurality of memory segments, database state information that identifies a stop position at which the computer system stopped reading the database log; and
        after the storing of the database state information, deallocating at least one of the plurality of memory segments other than the restart memory segment; and
    after performing the restart operation, resuming reading of the database log based on the stop position identified by the database state information.

11. The non-transitory computer readable medium of claim 10, wherein the restart operation further includes:
    storing, in the restart memory segment, purger state information that identifies a purge commit number indicating a most recent transaction whose database records have been purged from the computer system; and wherein the operations further comprise, after performing the restart operation, resuming to purge, based on the purge commit number, database records associated with a set of transactions occurring after the most recent transaction.

12. The non-transitory computer readable medium of claim 10, wherein the operations further comprise:

after performing the restart operation, allocating the at least one memory segment without allocating the restart memory segment.

13. The non-transitory computer readable medium of claim 10, wherein the database state information specifies a flush commit number that indicates transactions whose database records have been written to a storage that is separate from the physical memory, and wherein the stop position and the flush commit number define a transaction window that indicates, for which transactions, there are database records stored in the restart memory segment.

14. The non-transitory computer readable medium of claim 10, wherein the performing of the restart operation is based on determining that the computer system has been elected to become a primary node of a node cluster.

15. A system, comprising:

at least one processor; and memory having program instructions stored thereon that are executable by the at least one processor to cause the system to perform operations comprising:

allocating a plurality of memory segments in the memory;

inserting database records into one or more of the plurality of memory segments, wherein the inserting includes reading a database log;

determining to perform a restart operation to transition from a read mode to a write mode in which the system is permitted to process write transactions, wherein the restart operation includes:

storing, in a restart memory segment of the plurality of memory segments, database state information that identifies a stop position at which the system stopped reading the database log; and deallocating at least one of the plurality of memory segments other than the restart memory segment; and after performing the restart operation, resuming reading of the database log based on the stop position identified by the database state information.

16. The system of claim 15, wherein the restart operation further includes:

storing purger state information that identifies a purge stop position in a purge process involving purging database records from the system, wherein the purger state information enables the system to resume the purge process from the purge stop position.

17. The system of claim 15, wherein the operations further comprise:

after performing the restart operation, accessing recovery metadata from a catalog store separate from the system, wherein the recovery metadata identifies a recovery window that is based on a recovery position from which to read the database log; and updating the recovery window by replacing the recovery position with the stop position so that the database log is read based on the stop position instead of the recovery position.

18. The system of claim 15, wherein the database state information specifies a read commit number that indicates which database records stored in the restart memory segment are accessible to queries of the system, and wherein the database state information specifies a flush commit number that indicates a most recent transaction whose database records have been written to a persistent storage separate from the system.

19. The system of claim 15, wherein the determining to perform the restart operation is in response to determining that a node cluster having system has become a primary node cluster.

20. The system of claim 15, wherein the deallocating is performed after a determination that a set of queues has been drained of log records enqueued by a process that reads the database log.

* * * * *